US009684911B2

(12) United States Patent
Audet

(10) Patent No.: US 9,684,911 B2
(45) Date of Patent: Jun. 20, 2017

(54) METHOD OF COMMUNICATING AND REPARTITIONING VEHICLES

(75) Inventor: Mathieu Audet, Montréal (CA)

(73) Assignee: Mathieu Audet, Montreal (CA)

( * ) Notice: Subject to any disclaimer, the term of this patent is extended or adjusted under 35 U.S.C. 154(b) by 37 days.

(21) Appl. No.: 12/832,869

(22) Filed: Jul. 8, 2010

(65) Prior Publication Data
US 2011/0010300 A1    Jan. 13, 2011

Related U.S. Application Data

(60) Provisional application No. 61/224,169, filed on Jul. 9, 2009, provisional application No. 61/234,500, filed on Aug. 17, 2009.

(51) Int. Cl.
*G06Q 30/06* (2012.01)
*G06Q 10/06* (2012.01)
*G06Q 50/30* (2012.01)

(52) U.S. Cl.
CPC ............ *G06Q 30/06* (2013.01); *G06Q 10/06* (2013.01); *G06Q 30/0645* (2013.01); *G06Q 50/30* (2013.01)

(58) Field of Classification Search
CPC ...................................................... G08G 1/20
See application file for complete search history.

(56) References Cited

U.S. PATENT DOCUMENTS

| 5,917,407 | A | * | 6/1999 | Squire et al. ................. 340/432 |
| 6,061,660 | A | * | 5/2000 | Eggleston et al. .......... 705/14.12 |
| 2003/0149617 | A1 | * | 8/2003 | Kobayashi ....................... 705/13 |
| 2004/0054561 | A1 | * | 3/2004 | Ogura et al. ...................... 705/5 |
| 2006/0116132 | A1 | * | 6/2006 | Le Gars ...................... 455/456.1 |
| 2007/0239627 | A1 | * | 10/2007 | Yui et al. ......................... 705/417 |
| 2009/0144151 | A1 | * | 6/2009 | Pajot .................. G06Q 30/0255 705/14.53 |
| 2009/0258642 | A1 | * | 10/2009 | Golenski ................ G08G 1/205 455/426.1 |
| 2011/0060480 | A1 | * | 3/2011 | Mottla et al. ..................... 701/2 |

OTHER PUBLICATIONS

U.S. Appl. No. 61/185,058, filed Jun. 8, 2009.*

* cited by examiner

*Primary Examiner* — Julie M Shanker
(74) *Attorney, Agent, or Firm* — Mathieu Audet

(57) ABSTRACT

Described herein is, inter alia, a method and a device for providing a number of rental vehicles at a station, determining at least one of a number of rental vehicles available at the station and a number of vehicle-receiving spaces available at the station, and sending the at least one of a number of rental vehicles available at the station and a number of vehicle-receiving space available at the station to a user. A distance and historical use of stations are also considered to suggest preferred stations and provide incentives associated therewith. A graphical user interface and a systems adapted to carry the method are also provided hereby.

20 Claims, 13 Drawing Sheets

○ Empty station
⊜ Some vehicles at the station
● Full station
⊕ Less used station
◯ Most used station

METHOD OF COMMUNICATING AND REPARTITIONING VEHICLES

CROSS-REFERENCE

The present United States patent application relates to and claims priority from U.S. provisional patent application No. 61/224,169, filed on Jul. 9, 2009, entitled REFRIGERATOR BIXI GPS SUPPORT and from U.S. provisional patent application No. 61/234,500, filed on Aug. 17, 2009, entitled REFRIGERATOR BIXI GPS SUPPORT 2, which are all incorporated herein by reference in their entirety. The disclosure of the '169 provisional application is contained in Appendix A, and the disclosure of the '500 provisional application is contained in Appendix B. Each of Appendix A and Appendix B forms a part of the present application and is incorporated herein by reference.

FIELD OF THE INVENTION

The present invention generally relates to a method for repartitioning vehicles. More precisely the present invention relates to means for distributing vehicles and prevents empty vehicle departure stations or full vehicle arrival stations.

BACKGROUND OF THE INVENTION

Shared fleets of vehicles, like cars or bicycles, are increasingly popular. Sharing a vehicle from a fleet provides a user to use a vehicle when needed and prevents the user to buy a vehicle and the cost associated therewith. The vehicles are also available at a number of different locations so that vehicles are available nearby popular locations. This turns into a convenient and economical way to commute. For example, car sharing is increasingly popular in Montreal, Quebec, Canada with Communauto (communauto.com). Clusters of shared cars are located in various locations where users can borrow them. Similarly, public bike rental systems are also increasingly popular. Such a bike rental system has been implemented in the city of Montreal, Quebec, Canada and is known under the name Bixi™ (bixi.com). It consists of a plurality of bikes rental stations configured to securely receive a plurality of rental bikes in respective docks. Each station has a network-based system with an interface used by the person who wants to rent a bike from the station or confirm return of the vehicle to the station.

Still referring to bikes, a station provides a plurality of bike receiving docks. Each vehicle is locked on a vehicle receiving dock. The vehicle is manually unlocked with a code when the rental transaction is accepted and the user is entitled to use the vehicle for a period of time. The vehicle is brought back to any station that has an empty dock when rental time is over. A bike that is returned to a station can automatically be recognized without intervention of the user with the interface of the station.

Each bike has a unique identifier recognized by a sensor on the dock connected to the station. It is therefore possible, because each station is connected to a network, to know if there is a vehicle in a dock and how many vehicles are docked at a station. This information could be made available via an Internet website to prevent a user to go to a station having no available vehicle to rent.

Distribution of bikes in each station is a constant challenge since vehicles are moving all the time from one station to the other. On the other hand, it is desirable to have a minimum number of bikes at each station to ensure minimum service from each station. The opposite issue arises when a user wants to bring back a bike to a station that is already full of vehicles and no dock is empty for receiving a bike returned after rental.

Rental vehicles are often equipped with minimal electronics. Additional onboard electronics is desirable to facilitate and improve the communication between the vehicle and the user. It is also desirable to use additional electronic devices that the user knows how to handle.

Therefore, a need for an improved vehicle rental system has been felt over the existing art.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

A method of distributing vehicles from a fleet of rental vehicles among stations is hereby provided.

A method of communicating information about available vehicles, available vehicle-receiving spaces and incentive thereof is hereby provided.

Is hereby provided a method to manage the distribution of vehicles among a plurality of stations to increase the likelihood of having vehicles available for rental at each station.

Is hereby provided a method to manage the distribution of vehicles among a plurality of stations to increase the chance there are empty vehicle-receiving spaces ready to receive a returning vehicle at each station.

Is hereby provided a method for determining a rental cost, or incentive reward(s), that takes into consideration stations that need additional vehicles or have too much vehicles therein to incite the user to bring their vehicle to a specific station.

Is hereby provided a method for providing an altered rental cost, or incentive reward(s) i.e. reward points, when a vehicle is returned to a station having a low number of vehicles or no vehicle thereat.

Is hereby provided a method for determining a rental cost, or incentive reward(s), that take into consideration stations that are full of vehicles to incite the user to rent the vehicle from a specific station(s).

Is hereby provided a method for determining rental cost of a vehicle, or incentive reward(s), based on actual expected demand based on past use history of vehicles.

Is hereby provided a method for transmitting vehicle availability related information and/or vehicle-receiving spaces related information to a mobile computing device of a user (for example using an SMS message, an email or a phone call).

Is hereby provided a method for transmitting rental cost or incentive reward(s) related information to a mobile computing device of a user (for example using an SMS message, an email or a phone call).

Is hereby provided a method to connect the network to a portable computing device of a user to send information of vehicle-receiving spaces availability at various stations in the neighborhood of the user.

Is hereby provided a method to determine a rental cost of a vehicle or incentive reward(s) at least based on vehicles availability at various stations and distances between stations.

Is hereby provided a mechanism configured to identify a rental vehicle with a portable computing device of a user.

Is hereby provided a vehicle rental system using a network to communicate with stations and configured to interact with portable computing devices of users of a vehicle.

Is hereby provided a pairing between a vehicle and mobile computing device to temporarily augment or complement the onboard electronics and improve the communication between the vehicle and the user; furthermore, the mobile computing device can be the mobile phone of the user that is already well known by the user thus reducing the learning time required to interact with the vehicle.

Is hereby provided a computer-readable medium comprising computer-readable instructions thereon, that, when executed, cause a computer to provide a number of rental vehicles at a station; determine at least one of rental vehicles available at the station and vehicle-receiving space available at the station; and send the at least one of rental vehicles available at the station and vehicle-receiving space available at the station to a user.

Is hereby provided a user graphical interface comprising a plurality of stations disposed on a map; and an indication of one of a number of available vehicles and a number of available vehicle-receiving spaces associated with at least one respective station.

Is hereby provided a method of reserving a vehicle based on vehicle availability though a mobile communication system.

Is also hereby provided a system for managing a fleet of rental vehicles, the system comprising a network configured to exchange data between a server and a plurality of vehicle rental stations; a vehicle availability module adapted to monitor a number of vehicles at a plurality of vehicle rental stations; and a rental incentive module adapted to establish a vehicle rental incentive based, at least in part, on the number of vehicle at a vehicle rental station.

Other objects, advantages and features hereby provided will become readily apparent to the people skilled in the art upon reading the following descriptions that makes reference to the accompanying drawings.

BRIEF DESCRIPTION OF THE DRAWINGS

In the appended drawings.

DESCRIPTION OF EMBODIMENT(S) OF THE INVENTION

The present invention is now described with reference to the figures. In the following description, for purposes of explanation, numerous specific details are set forth in order to provide a thorough understanding of the present invention. It may be evident, however, that the present invention may be practiced without these specific details. In other instances, well-known structures and devices are shown in block diagram or flow chart form in order to facilitate describing the present invention.

The following description will be exemplified by an application of embodiments of the present invention to rental bikes to facilitate the understanding of the skilled reader. Despite the description is directed to bikes it has to be considered that the invention can be practiced in respect with rental cars, motorcycles and other vehicles without departing from the scope of the present invention.

Exemplary Network

Figure 1:
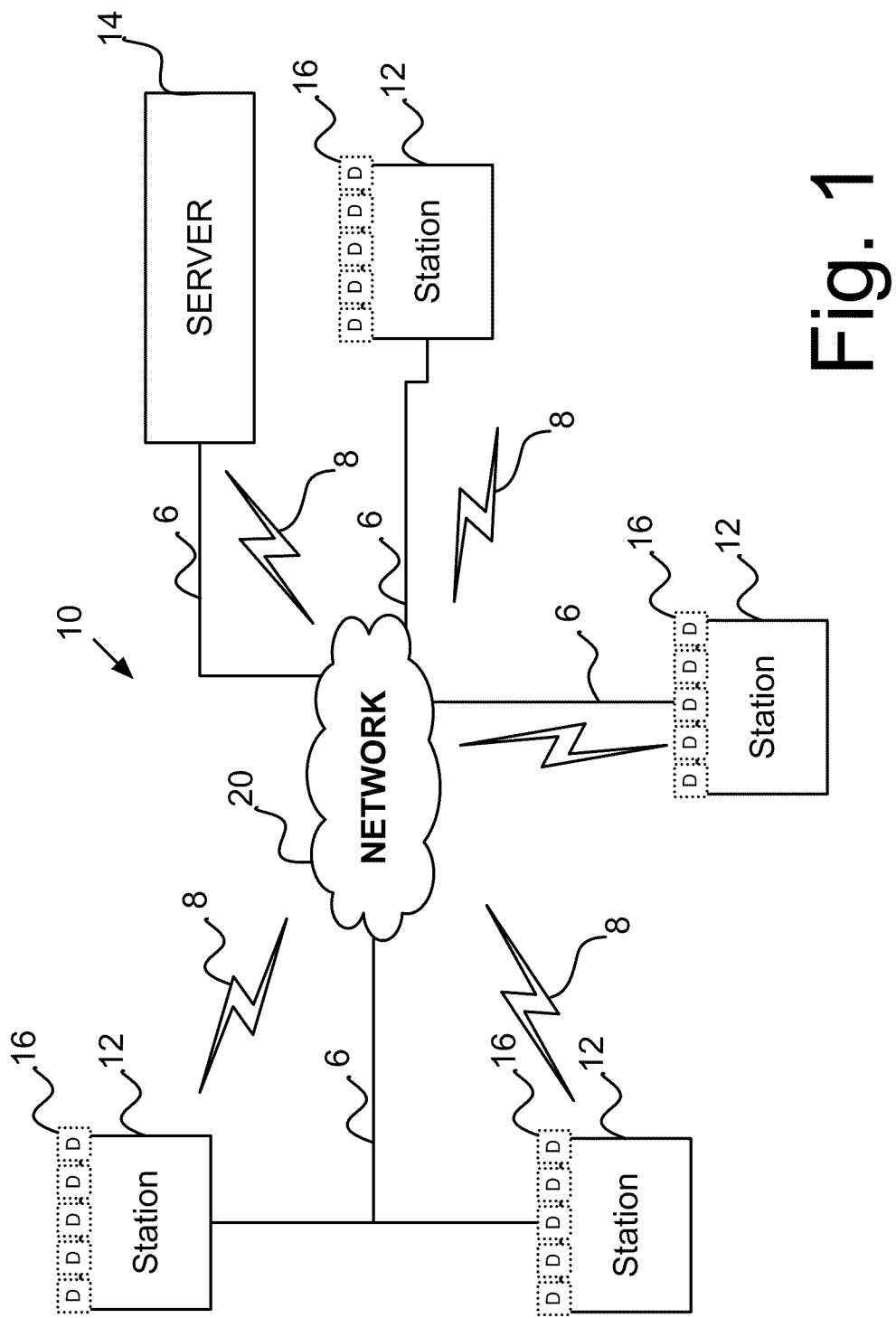
FIG. 1 is an exemplary schematic block diagram of a network interconnecting several stations in accordance with an embodiment of the invention.

FIG. 1 illustrates an exemplary network 10 in which a system and method, consistent with the present invention, may be implemented. The network 10 may include multiple vehicle rental stations 12, in the present situation, each rental station 12 is provided with a number of vehicle-receiving spaces 16 (that can also be called docks 16). The network 20 can equally use a wired 6, wireless 8 and optical (not shown) communication network. Each station 12 is adapted to communicate with a server 14 through the network 20. The server 14 and the computer 30 can be referred to as a general purposed computer system to define its components and properties that are analogous to a computer system and be referred to as an exemplary rental system thereafter. The network 20 may include a local area network (LAN), a wide area network (WAN), a phone network, such as the Public Switched Phone Network (PSTN), an intranet, the Internet, Wi-Fi, WiMAX or a combination of networks. The server 14 may include one or more types of computer systems, such as a mainframe, minicomputer, or personal computer, capable of connecting to the network 20 to enable the server 14 to communicate with stations 12. In alternative implementations, the server 14 may include mechanisms for directly connecting to one or more stations 12. Two stations 12 and one server 14 have been illustrated connected to the network 20 for simplicity. In practice, there may be more or less stations 12 and servers 14. Also, in some instances, a station 12 may perform the functions of a server 14. Alternatively, each station 12 can connect to the network 20 alone with embedded communication equipment (not illustrated) that could illustratively be adapted to communicate with the network 14, with Internet protocol (IP) or via a mobile phone line.

The stations 12 may have the form of, but not limited thereto, a series of docks 16, a series of vehicle-receiving spaces like parking spaces, or rack spaces.

Figure 2:
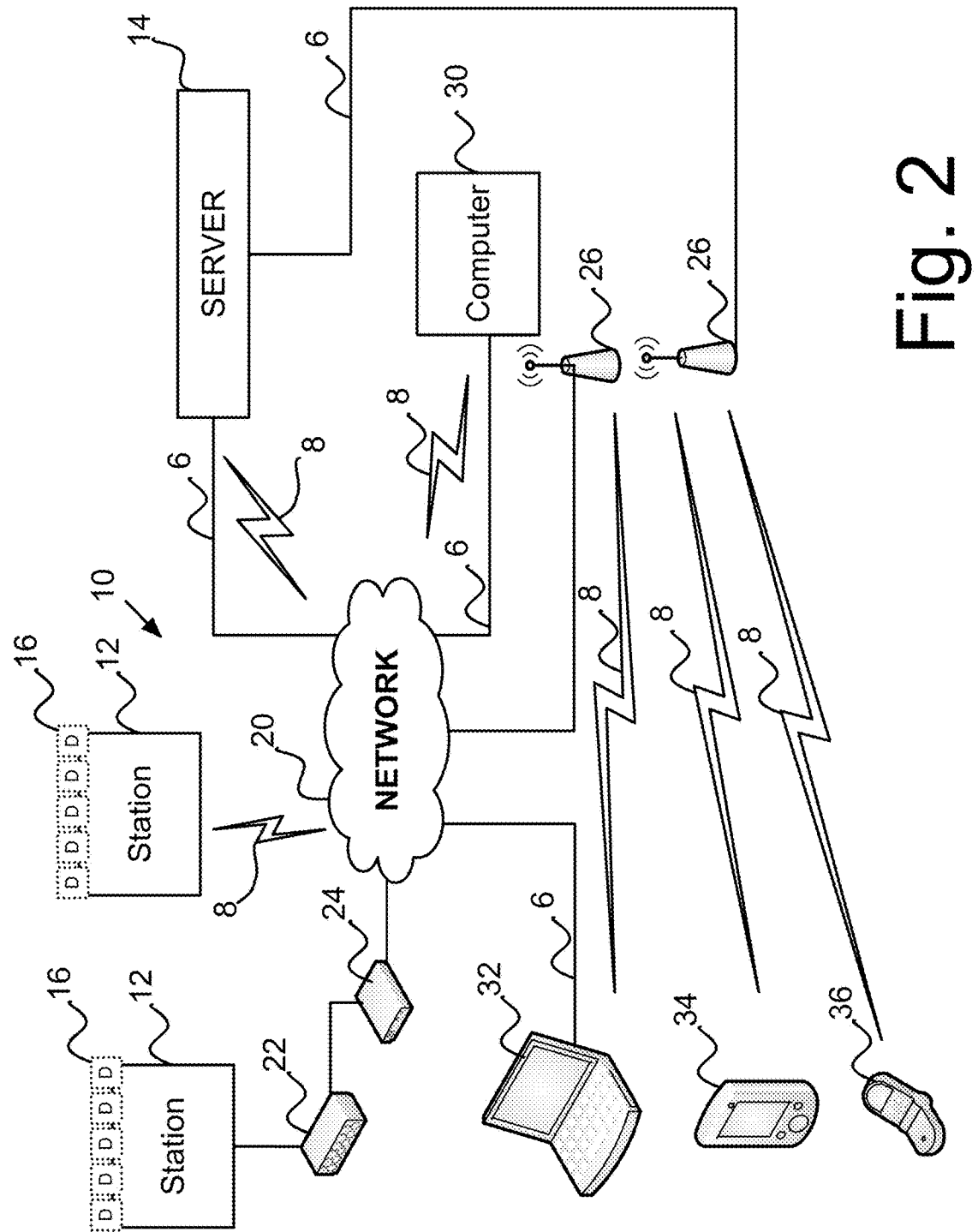
FIG. 2 is an exemplary schematic block diagram of a network interconnecting several stations in accordance with an embodiment of the invention.

In an implementation consistent with at least one embodiment, the server 14 may be used to communicate with other stations 12 and other machines capable of communicating with the network 20 via a wired (represented with solid lines in FIGS. 1 and 2) or a wireless connection (represented with lightning in FIGS. 1 and 2) using a wireless transmitter 26. With reference to FIG. 2, the network 20 includes the server 14 that is adapted to communicate with the stations 12 optionally using an embedded or an external hub 22 and modem 24. The server 14 and the stations 12 can communicate with other computers 30, portable computers 32, personal digital assistants 34 or mobile phones 36. Communications can be provided upstream or downstream for all connected devices.

Exemplary Client Architecture

The following discussion provides a brief, general description of an exemplary apparatus in which at least some aspects of the present invention may be implemented. The present invention will be described in the general context of computer-executable instructions, such as program modules, being executed by a computerized device having modules therein. However, other apparatuses may affect methods of the present invention. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including handheld devices, multiprocessor system, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network. In a distributed computing environment, program modules may be located in local and/or remote memory storage devices.

Figure 3:
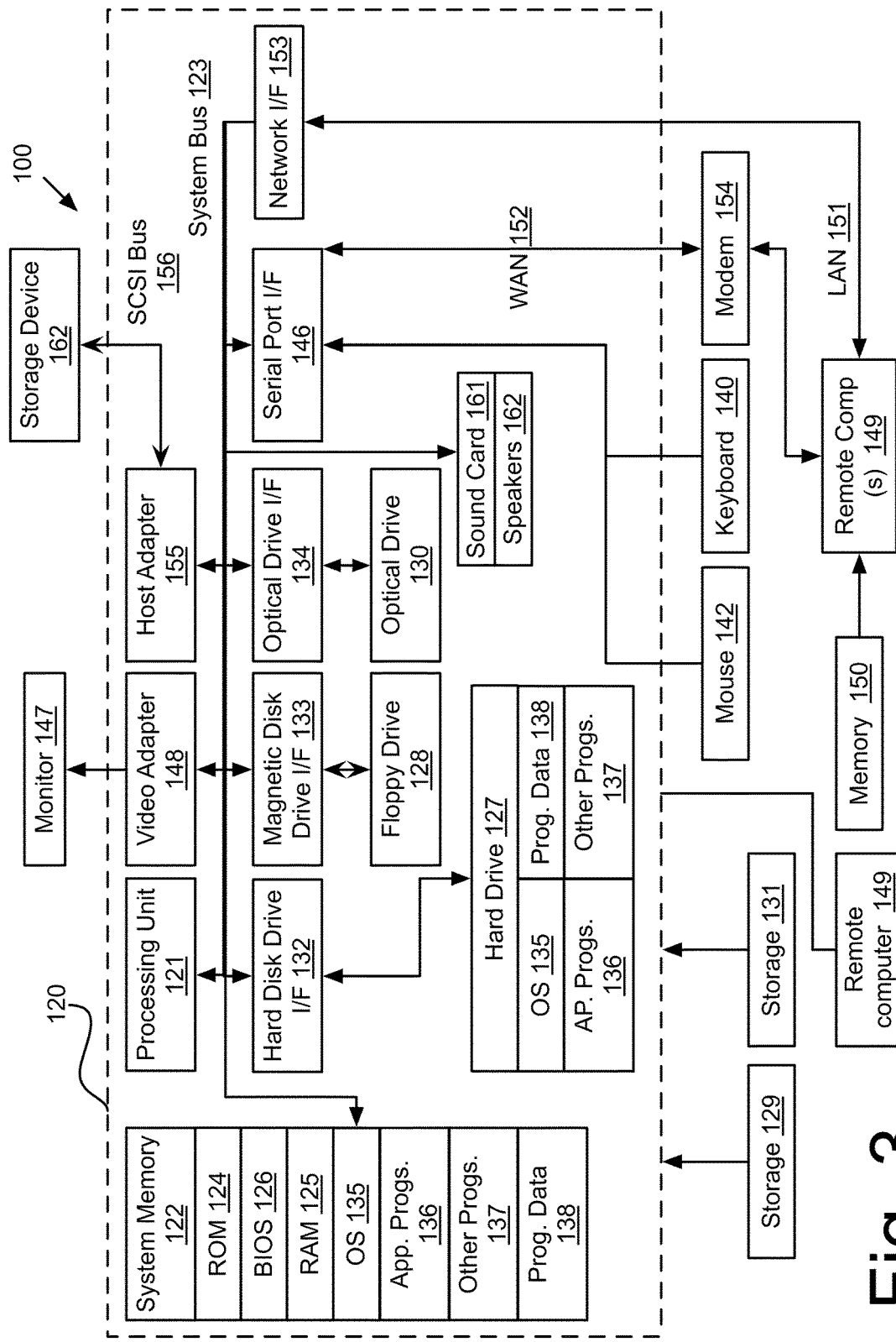
FIG. 3 is an exemplary schematic block diagram of a typical computer system in accordance with an embodiment of the invention.

With reference to FIG. 3, an exemplary apparatus 100 for implementing at least some aspects of the present invention includes a general-purpose computing device in the form of a computerized machine 120 or in the form of a computerized portable apparatus. The computerized machine 120 generally includes a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer data between elements within the computerized machine 120, such as during start-up, may be stored in ROM 124. The computerized machine 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide non-volatile (or persistent) storage of machine-readable instructions, data structures, program modules and other data for the computerized machine 120. Although the exemplary environment described herein employs a hard disk, a removable magnetic disk 129 and a removable optical disk 131, these skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT® 4.0, sold by Microsoft® Corporation of Redmond, Wash. Or an alternate proprietary operating system adapted to provide only the functions required by the present cooling devices 12), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and data into the computerized machine 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the computerized machine 120 may include other peripheral output devices (not shown), such as a printer for example. As an alternative or an addition to the video monitor 147, a stereo video output device, such as a head mounted display or LCD shutter glasses for example, could be used.

The computerized machine 120 may operate in a networked environment, which defines logical connections to one or more remote computers, such as a remote computer 149. The remote computer 149 may be another personal computer, a server, a router, a network PC, a peer device or other common network node, and may include many or all of the elements described above relative to the computerized machine 120, although only a memory storage device has been illustrated in FIG. 3. The logical connections depicted in FIG. 3 include a local area network (LAN) 14 and a wide area network (WAN) 152, an intranet and the Internet.

When used in a LAN, the computerized machine 120 may be connected to the LAN 14 through a network interface adapter (or "NIC") 153. When used in a WAN, such as the Internet, the computerized machine 120 may include a modem 154 or other means for establishing communications over the wide area network 152 (e.g. Wi-Fi, WinMax). The modem 154, which may be internal or external, may be connected to the system bus 123 via the serial port interface 146. In a networked environment, at least some of the program modules depicted relative to the computerized machine 120 may be stored in the remote memory storage device. The network connections shown are exemplary and other means of establishing a communications link between the computers may be used.

Figure 4:
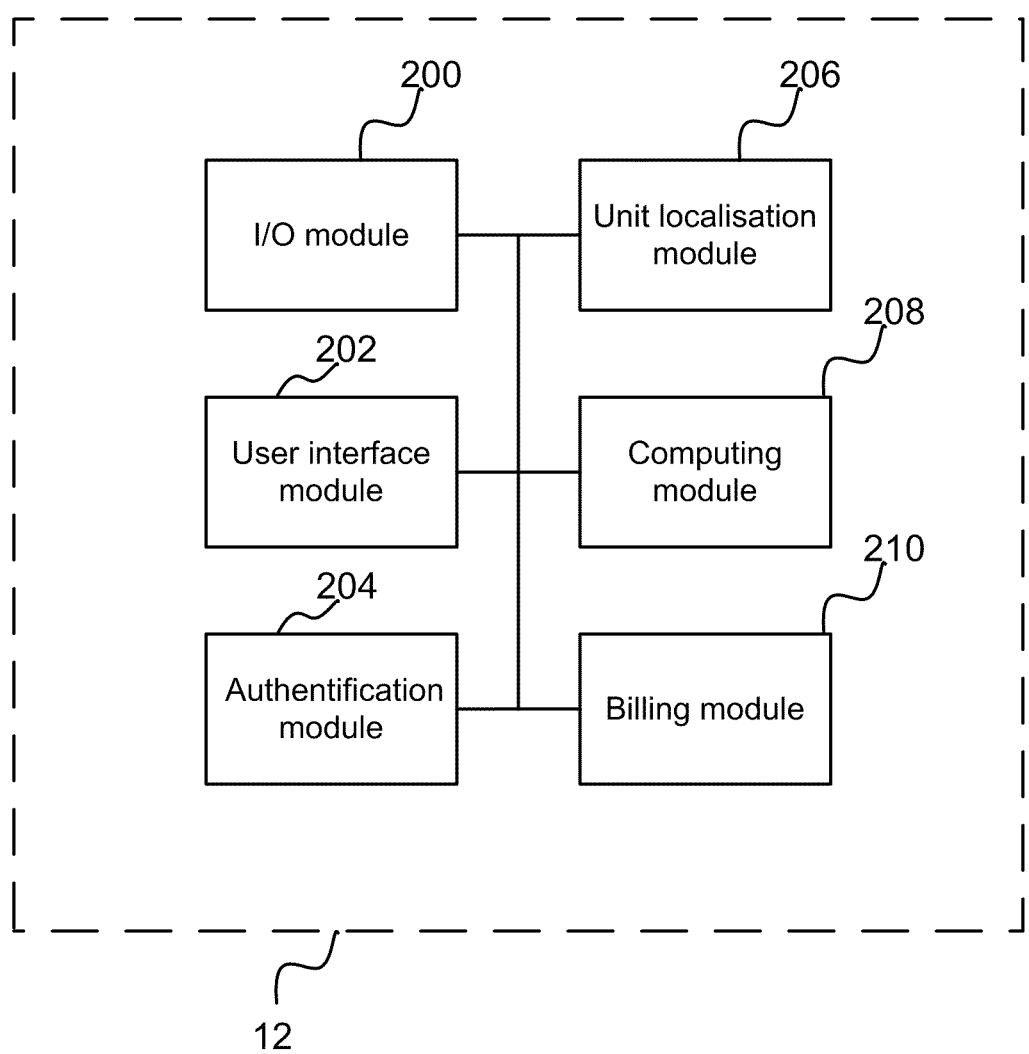
FIG. 4 is an exemplary schematic block diagram of a system in accordance with an embodiment of the invention.

Turning now to FIG. 4 illustrating an exemplary embodiment of a station 12 with significant illustrative modules therein. Each station 12 might comprise an input/output (I/O) module 200 configured to receive inputs such as signals from the network 20 or inputs from a user and provide outputs like an output signal from the station 12. A user interface module 202 is adapted to provide text and graphical dialogs to the user and receive inputs from the user. An authentication module 204 is adapted to carry out an authorization task that could be, for example, to receive credit card data, finger print data or alphanumerical password code to associate and authentify a user with the rental system. A unit localization module 206 tracks vehicles (alternatively units or bikes or cars or scooters for instance) attached to their respective docks 16 at a plurality of stations 12 and localize them on a map such that localization and distribution is assessed and demonstrated if required to the user in either a list or a graphical form as later exemplified by FIG. 13. A computing module 208 provides computing power for processing data, collects inputs and provides outputs thereof. A billing module 210 is also provided at station 12 to manage all payments required with each vehicle rental. Payment can be made with a credit card, Interac or other physical or electronic payment means including through the use of an electronic wallet residing in a mobile phone.

Figure 5:
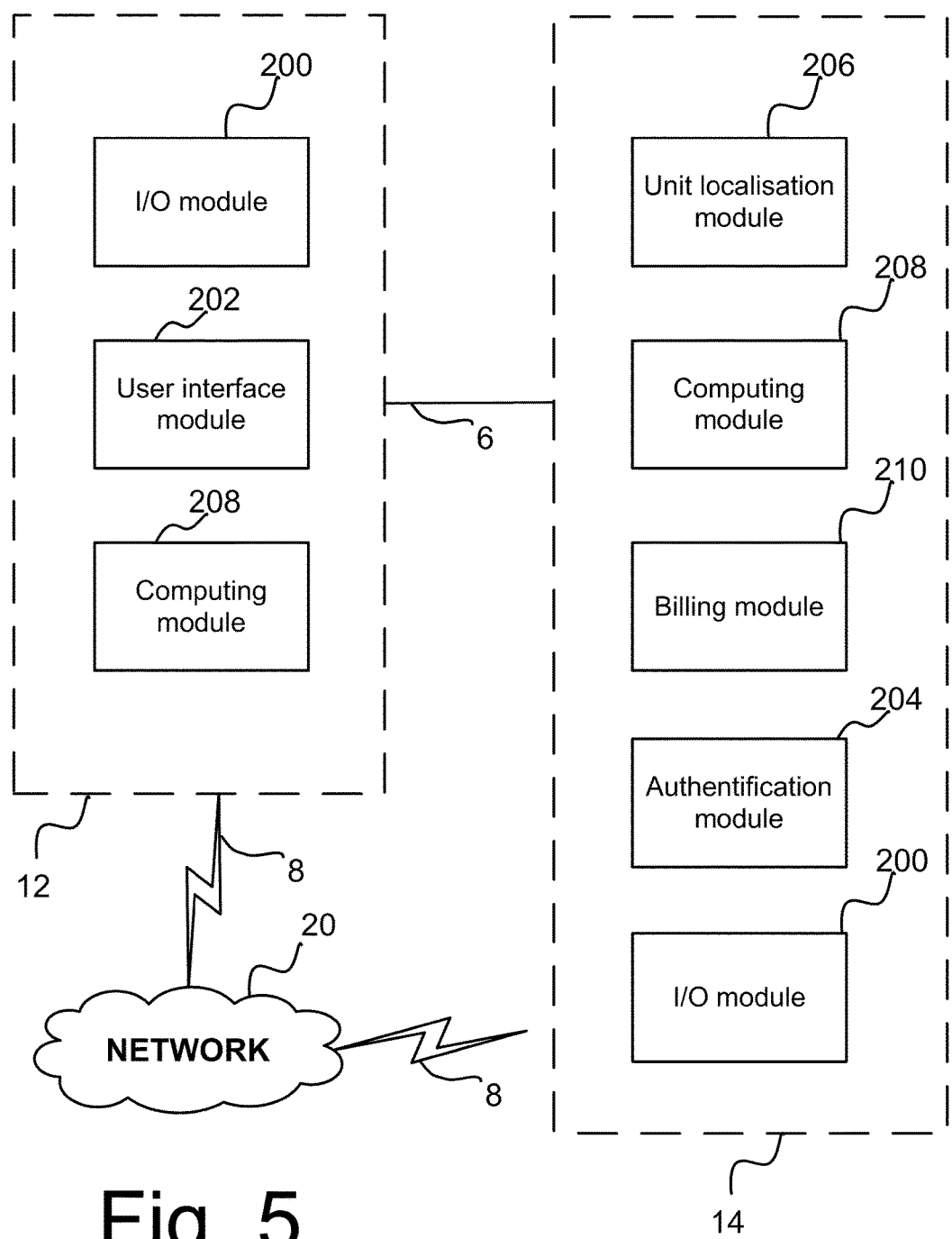
FIG. 5 is an exemplary schematic block diagram of a system in accordance with an embodiment of the invention.

FIG. 5 is an alternate embodiment of the system described in FIG. 4 where modules are distributed between the station 12 and the server 14 interconnected via the network 20. In this networked embodiment the station 12 comprises the I/O module 200, the user interface module 202 and a computing module 208 comparable to the previous embodiment. Some functions are performed with modules disposed on the server 14. The server 14, in this embodiment, comprises the unit localization module 206, a computing module 208 adapted to provide calculation capabilities to the server 14, the billing module 210, the authentication module 204 and an I/O module 200. The modules, and/or the functions they respectively provide, can be distributed in other ways between the server 14 and the stations 12 without departing from the scope of the present invention.

Figure 6:
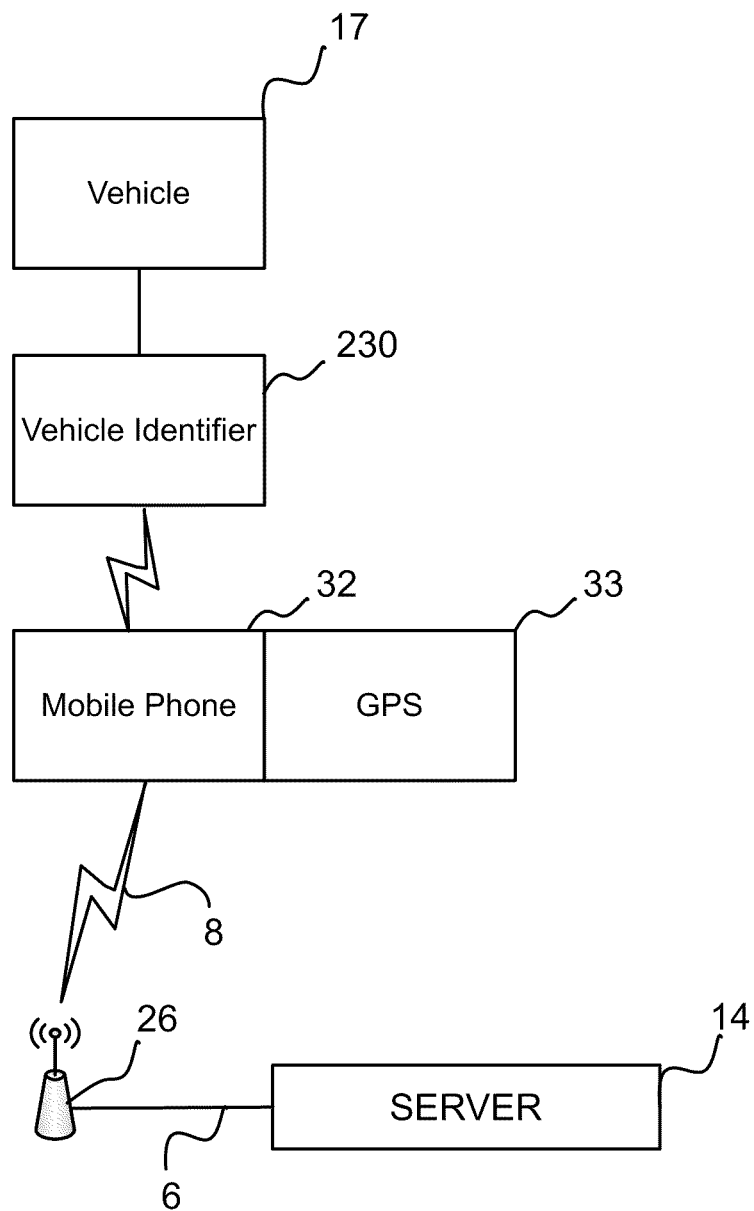
FIG. 6 is an exemplary schematic block diagram of a system for associating a mobile computing device with a vehicle in accordance with an embodiment of the invention.

A mobile computing device, such as a mobile phone 32, as illustrated in FIG. 6, can be integrated to the network 20 to remotely interact with the network 20 when the vehicle 17 is on the move. The mobile phone 32 becomes an extension of the network 20 to provide the user with a user graphical interface capability enabling further or more complicated user interactions with the network 20. It is desirable that the mobile phone 32 be paired with the vehicle 17 to identify the vehicle 17 to the network 20 and the server 14. The vehicle 17 identification can be made, for instance, with a vehicle identifier 230 that can be an identification number or a serial number. Pairing of the mobile phone 32 can be made with the recognition of a vehicle identifier 230 that can be embodied in an RFID tag associated with the vehicle. If any electronics is embedded on the vehicle, then, a connection via Bluetooth™ can be performed and further interactions between the vehicle 17 and the mobile phone 32 can be made. The mobile phone 32 could, for example, get some information from the vehicle 17 such as the speed of the vehicle 17, the distance performed by the vehicle 17, the time of connection between the mobile phone 32 and the vehicle 17 (or with the vehicle identifier 230), the rental cost based, at least in part, on the time of connection. In other words, a two ways dialogue can occur between the vehicle 17 and the mobile phone 32 as opposed to a simple passive identification. A wired connection, although it might not be the most desirable, is encompassed by the present disclosure and is considered to be a proper way to connect the mobile phone 32 with the vehicle 17.

Alternatively, a user can make a vehicle reservation through a computer or a mobile computing device. The system provides the user with vehicle 17 availability in real time or extrapolates the availability of vehicles 17 in the future based on historical data. Once the reservation is made, the user can directly associate his or her mobile computing device 32, 34, 36 (e.g. mobile phone 32) with a vehicle at a predetermined station 12 to unlock the vehicle 17. Once the mobile computing device 32, 34, 36 of the user is associated with the vehicle 17, the system acknowledges rental of the vehicle 17 and processes rental information.

Figure 7:
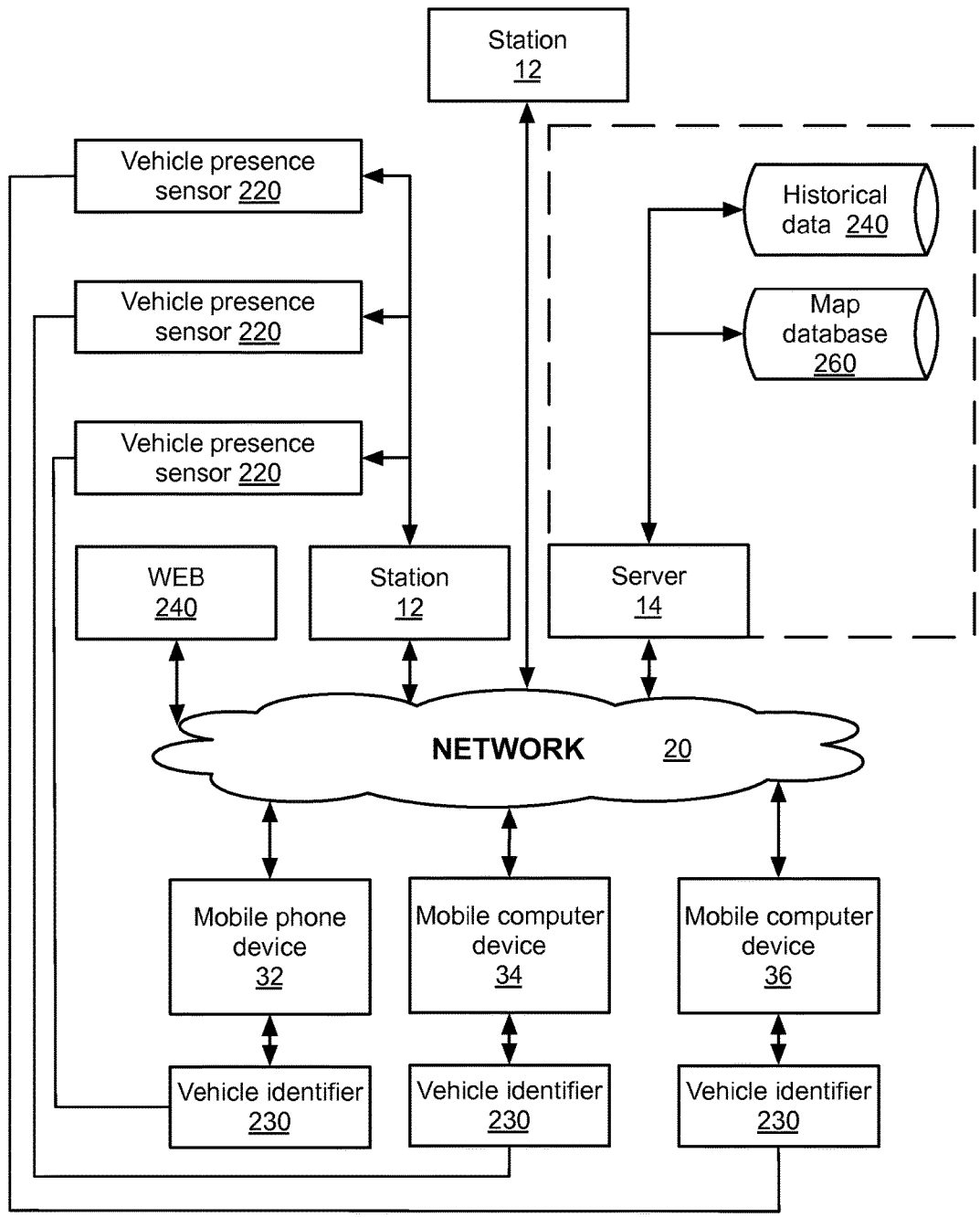
FIG. 7 is an exemplary schematic block diagram of a system for managing data between vehicles, stations and computing devices in accordance with an embodiment of the invention.

Geographical localization functions 33 of the mobile phone 32 can be used to locate the vehicle 17 and provide the information to the network 20. FIG. 7 illustrates another exemplary alternate embodiment adapted to connect additional computer devices 32, 34, 36 to the network 20 to exchange data with the computer devices 32, 34, 36, to extend the network 20 and for performing additional functions thereby. A series of vehicle presence sensors 220 adapted to recognize a vehicle 17 secured in an associated dock 16, or present on a parking space, is connected to the station 12. As previously mentioned, each vehicle is equipped with a unit identifier 230 allowing individual vehicle 17 recognition by the presence sensor 220. The station 12 is thus adapted to detect an individual vehicle 17 equipped with its respective vehicle identifier 230 (illustrated in FIG. 6). The vehicle presence sensor 220 is further adapted to send a corresponding signal to the station 12 that will be transmitted to the server 14. The system illustrated in FIG. 7 is further connected to the Internet to be accessed via a website or another web enabled application (e.g. a browser, an application or an iApp™ for iPhone™).

As mentioned above, the vehicle identifier 230 is associated with a specific vehicle 17 to pair the vehicle 17 with the dock 16 and also to pair with the computer device 32, 34, 36 of the user. This pairing of the vehicle identifier 230 and the computer device 32, 34, 36 of a user allows to associate a vehicle 17 with the computer device such that the system embodied in FIG. 7 can transfer data to the computer device 32, 34, 36 of the user of the vehicle 17 taking into consideration which vehicle 17 is paired therewith. Again, the vehicle identifier 230 could be an RFID tag, a blue tooth wireless connection or another means suitable to associate a computer device 32, 34, 36 with a vehicle 17. Lets assume, as discussed above, that the computer device 36 is a mobile phone 32. The mobile phone 32 is paired with the vehicle identifier 230 of the vehicle 17 and uses the unit identifier 230 so that the mobile phone 32 is configured to exchange data with the network 20 related with the activity of the user with the identified vehicle 17. Data could be provided in the form of SMS text, e-mail message, via a web page or a dedicated application that manages data related to the activity of the user with the rented vehicle 17. This embodiment of the invention will be discussed later in more details.

Alternatively, usage data can be recorded on the computer device 32, 34, 36 to allow the user to track his or her performance. The duration, the speed, the vertical distance and the pace along the run can be recorded and used to provide statistics of use that can be material into providing metrics for improving the user's performance with the vehicle 17—if the vehicle 17 is adapted for doing exercise, like a bike.

Figure 8:
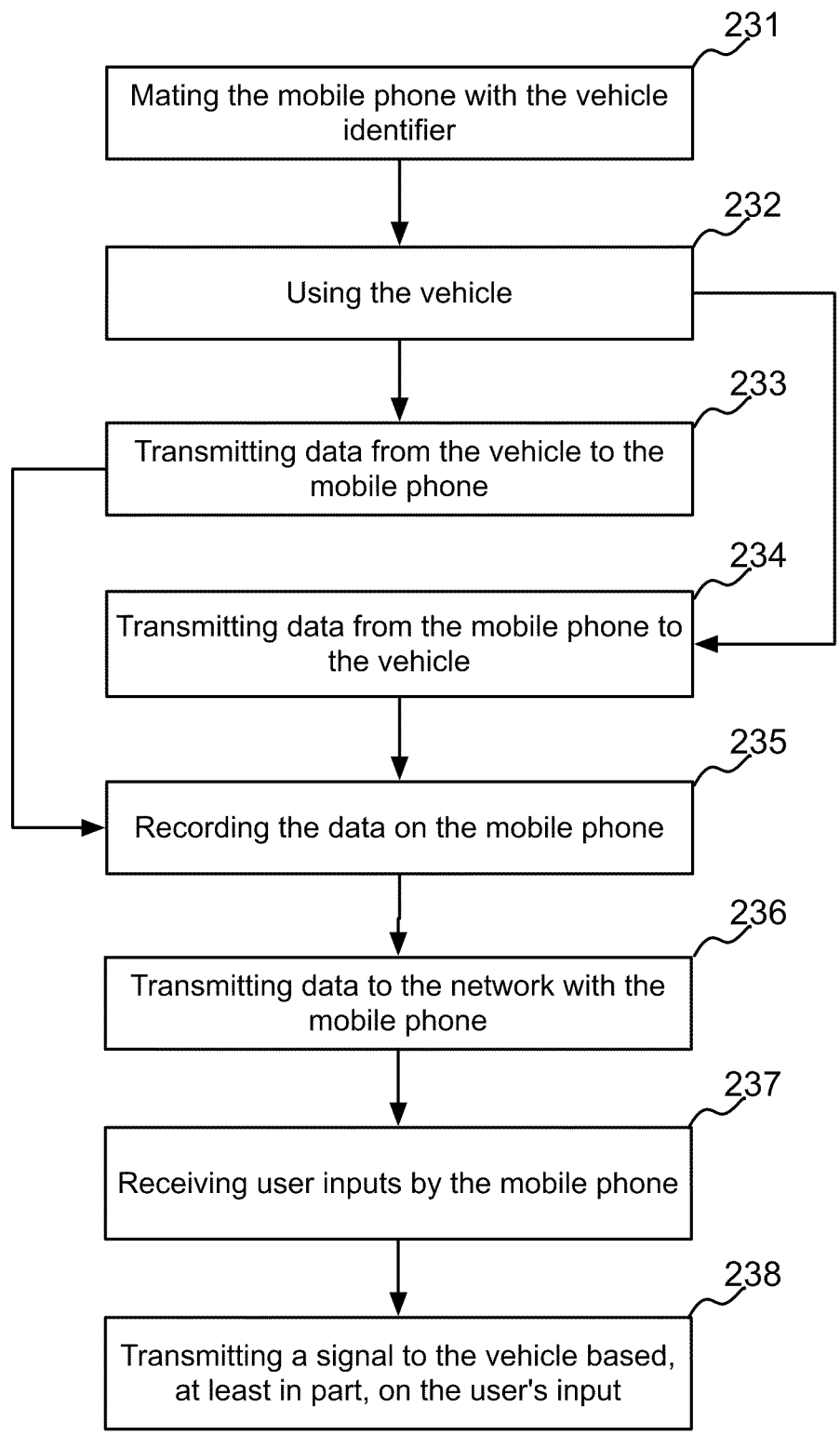
FIG. 8 is an exemplary illustrative flow chart of an interaction sequence between a computing device and a vehicle in accordance with an embodiment of the invention.

FIG. 8 illustrates an exemplary flow chart of a possible way to practice embodiments of the present invention. Again, a parallel with a fleet of rental bikes can be made in view of the generalized example that follows. The present illustrative example explains how a user can connect her or his mobile phone 32 to a vehicle 17. In more details, the user gets next to a vehicle 17 and establishes the connection with the vehicle 17 with his or her mobile phone 32, 231. A basic connection can be made by recognizing an RFID of the vehicle to identify the vehicle 17. An extended connection can be made by connecting the mobile phone 32 with a Bluetooth™ connection with proper electronics embedded in the vehicle 17. The latter being adapted to exchange data with the vehicle 17 in a more flexible fashion. Once the connection is established, the mobile phone 32 of the user might be used to unlock the vehicle 17 from its securing dock 16 (assuming that registration has been previously made). A signal from the mobile phone 32, or a more or less automatic recognition of the specific mobile phone 32 of the user, provides an authentication suitable for the station 12 to unlock a vehicle 17. Then the user uses 232 the vehicle 17 and the vehicle 17 transfers data to the mobile phone 32, 233, such as the distance traveled with the vehicle 17, to the mobile phone 32. In contrast, data can be transferred to the vehicle 17 from the mobile phone 32, 234 such as downloading a predetermined route or vehicle's setup, for example. Data is transferred and stored on the mobile phone 235 as long as the user uses the vehicle 17 for collecting data used for statistics purposes, for instance. Once data is acquired by the mobile phone 32, the mobile phone 32 can optionally transmit the data 236 to the network 20. The network 20 and/or the vehicle 17 can send signals to the mobile phone 17 that would require user interactions. The user interactions can occur via the mobile phone 32 interface 237 and the mobile phone 32 sends back a corresponding signal to the network 20 and/or the vehicle 17 based on the user's input 238. In other words, the mobile phone 32 of the user serves as an extension of the network 20 and the vehicle 17 to ease interactions with the user despite the lack of a sophisticated interface from the vehicle 17 itself.

A significant issue with vehicle rental systems, such as the one illustratively presented herein, is that some stations 12 are very popular as arrival stations 12 while other stations 12 are very popular departure stations 12. This causes a problem because the most popular departure stations 12 are often empty of vehicles 17 and most popular arrival stations 12 are often full of vehicles 17. Vehicles 17 need to be manually redistributed to ensure minimum service is offered from and to each station 12. Redistributing vehicles 17 is costly and labor intensive. A team with an adapted vehicle (truck and trailer in the case of bikes) redistributes the vehicles 17 among stations 12. An aspect of the present invention provides a method to provide an incentive to a user by, for instance, altering the rental cost when a renter uses a station 12 that misses vehicles 17 therein as arrival station 12 or when the renter uses a station 12 that has too much vehicles 17 therein as departure station 12. The illustrative embodiments therein are directed to altered rental cost however the incentive could be provided otherwise to the renter. Bonus points, reward points (not limited to points but encompassing means to represent a value) of a reward program could be given to the user, price reduction on the vehicle 17 rental system registration could be provided, price reduction to buy other goods (assuming there is an agreement to do so with merchants which could be possible since some merchants could find advantageous to get more users of vehicles 17 using a nearby station 12, for instance) could be provided in exchange of using a rented vehicles 17 between stations 12 that need to get rid of vehicles 17 therefrom or receive vehicles 17 therein.

Reward points in an embodiment of the invention could be embodied as Airmiles™ (airmiles.com) or Aeroplan™ (aeroplan.com) or any other existing, dedicated or not, incentive reward mechanism. In an exemplary embodiment, the user is offered a number of reward points depending of how helpful the trip of the renter with the vehicle 17 and the selected stations 12 are to the distribution of the vehicles 17 among stations 12. If the vehicle 17 is rented from a station 12 that is full of vehicles 17, the user receives a lot of points. Conversely, if the rented vehicle 17 is taken from a station 12 having a low number of vehicles 17 therein, no (or little) reward points are given. The rental system can suggest departing or arrival stations 12 based on the fleet of vehicle 17 distributions. Stations 12 suggestions can be made by the system through Internet with associated reward points when applicable. The user can therefore decide of his/her departing and arrival stations 12 and potentially collect points.

In one embodiment of the invention the bonus points system is structured: 1) to help the vehicle 17 rental system to better distribute the rented vehicles 17 among stations 12 by providing an incentive to people who rent vehicles 17 to use specific stations 12 without physical intervention from the vehicle 17 rental system (e.g. like moving bikes with a truck and a trailer among stations in the case of a bike rental system like Bixi™); 2) to allow the user to use the collected reward points to buy goods or services; and 3) to advertise selected merchants where reward points can be used. For example, merchants can be merchants or stores located nearby a specific station 12 (within a predetermined distance thereof) who have advantages to bring traffic to a nearby station 12. Many stations 12 can be considered for the same merchant. The merchant would fund the points system digressively farther the selected station 12 is from the merchant's store. In other words, those who gain advantages from it can fund the incentive reward system. The vehicle 17 rental entity that does not need to redistribute vehicles 17 among the stations 12 and the merchants nearby (or not, the distance is not an absolute criteria of the present embodiment) stations 12 to attract potential customers are both beneficiary of the reward system. Advertising on the vehicles 17, on the stations 12, on virtual vehicle rental portal(s) or on the mobile phone 32 of a renter when it is paired with a vehicle 17 are encompassed by the present invention to potentially pay, inter alia, for the reward points system.

Figure 9:
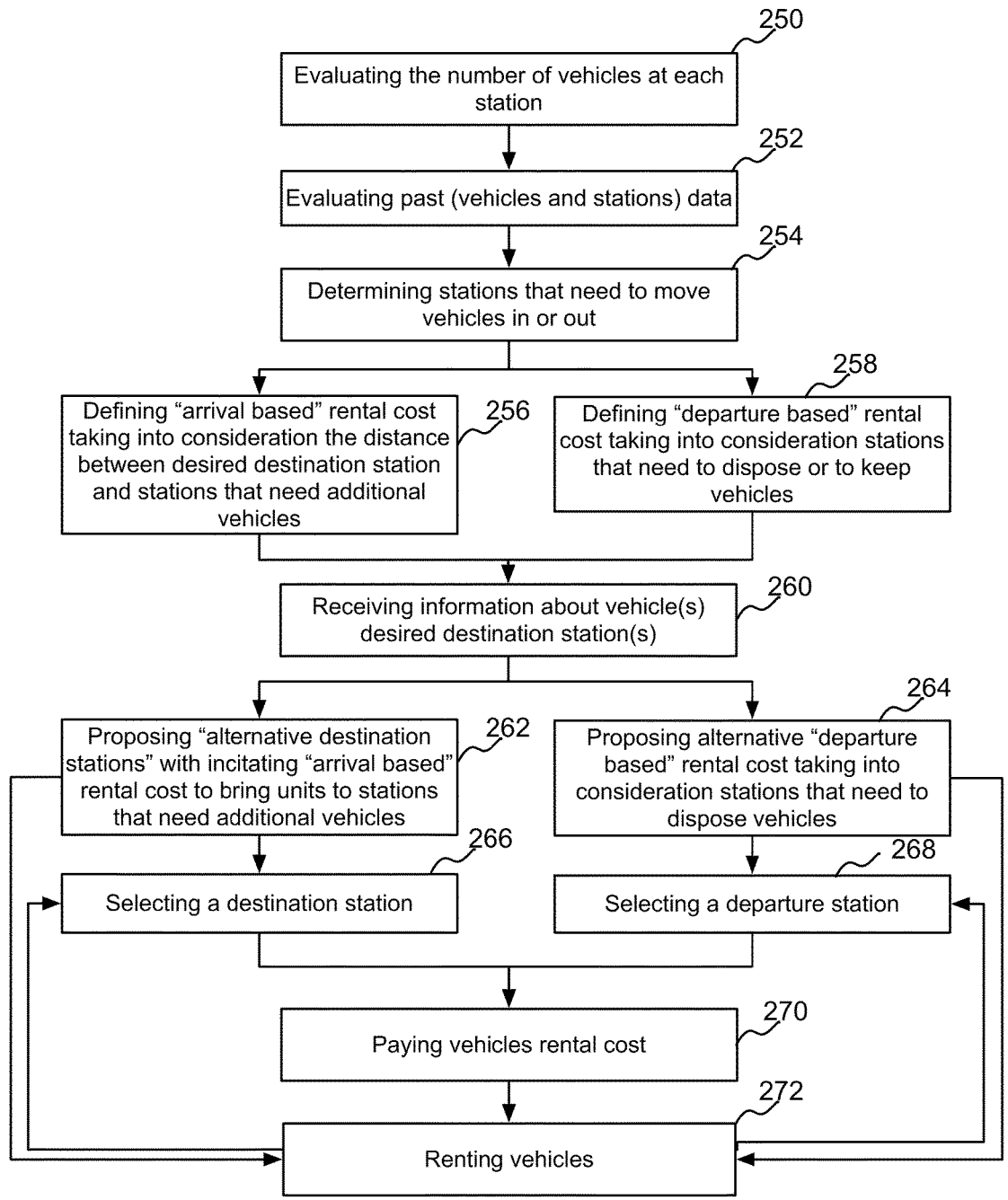
FIG. 9 is an exemplary illustrative flow chart of an interaction sequence between a computing device and a user in accordance with an embodiment of the invention.

Turning to FIG. 9 illustrating an exemplary process to determine a vehicle rental cost in function of the number of vehicles 17 docked in stations 12. This helps improve the repartition of vehicles 17 among stations 12. The exemplary embodiment goes as follows: The number of vehicles 17 in stations 12 is evaluated 250 and past use data of vehicles 17, 252, is analyzed to determine 254 where the most critical needs are among the stations 12 (past use data is stored in the historical data memory 240 illustrated in FIG. 7). The system determines which stations 12 have too little units therein to meet the "departure" demand and which stations 12 have too much vehicles 17 therein to meet the "arrival" demand. Preferred destination stations 12 are identified and "arrival based" vehicle rental cost are established 256 to influence renters (user of a rented vehicle 17) to use preferred destination stations 12 as arrival stations 12 to help better distribute the vehicles 17 among stations 12 in function of vehicles 17 demand. In contrast, in the goal of freeing some docks 16 in stations 12 where docks 16 are too crowded and are historically known to be popular "arrival stations", advantageous departure based rental cost are established 258 to incite renters to rent vehicles 17 from these stations 12.

Still referring to FIG. 9, the renter identifies the desired destination (or arrival) station 12, 260 (the departure station 12 is known if the renter rents a vehicle 17 from a station 12). The system then proposes alternate destination stations 12, 262, with associated advantageous rental cost or reward points. On the other hand the system can propose alternative departure stations 12, 264, with associated advantageous rental cost. The renter selects the destination station 266 or the departure station 268 (because a renter can decide to take a vehicle 17 from a preferred departure stations 12 instead of a station 12 offering no additional benefit to take a vehicle 17 from and also select a preferred arrival station to maximize his or her rental benefits. The renter pays for the rental cost 270 and rents the vehicle 17, 272, to use the vehicle 17. The steps could be ordered differently if desired without departing from the scope of at least one embodiment of the invention.

Figure 10:
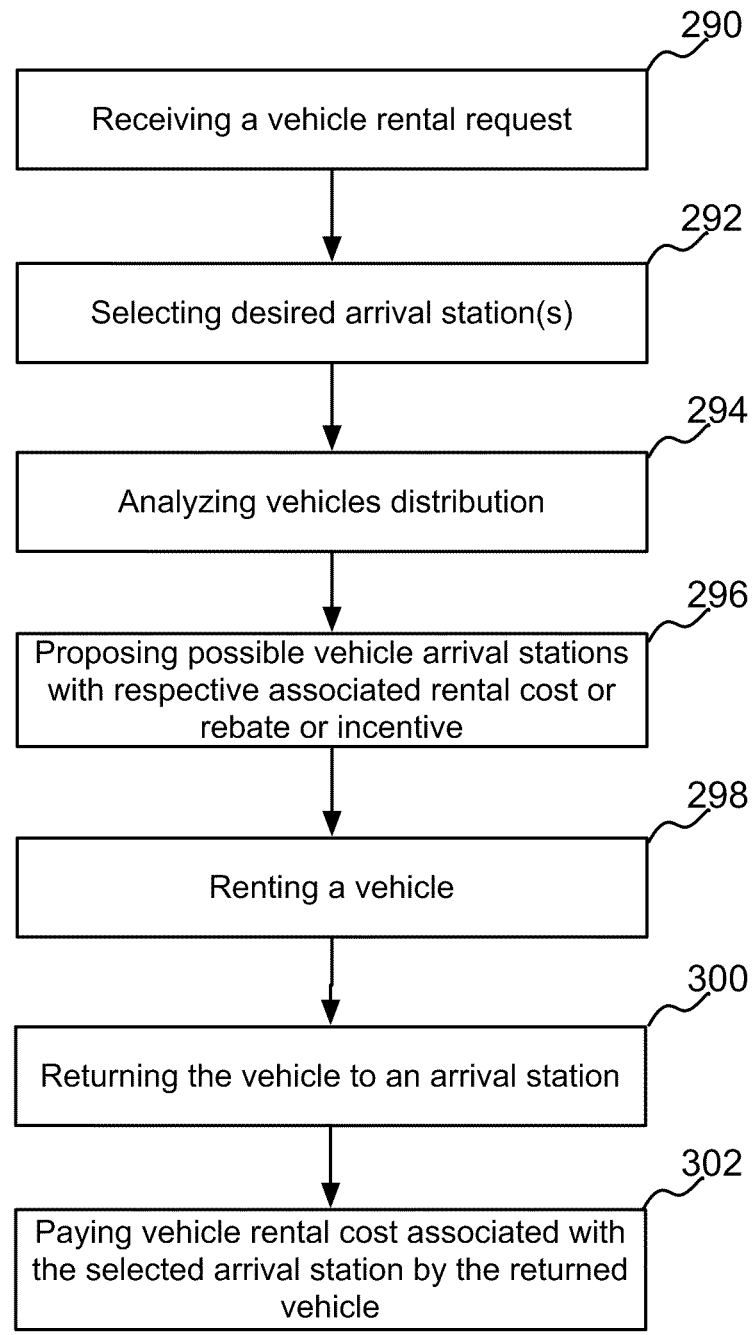
FIG. 10 is an exemplary illustrative flow chart of an interaction sequence between a system and a user in accordance with an embodiment of the invention.

Turning now to FIG. 10 illustrating another series of exemplary steps to rent a vehicle 17. A vehicle rental request is received 290 and the desired arrival station(s) 12 is selected 292 by the user. The system analyzes the vehicles 17 distribution in various stations 12, 294, and proposes possible arrival stations 12 with associated benefits 296 thereof. The renter rents a vehicle 17, 298, and returns the rented vehicle 17 to an arrival station 300. Finally the renter pays 302 the vehicle rental cost associated with the selected arrival station 12; it could be a reduced rental cost, get bonus points therewith or other privileges or advantages provided therewith if the selected arrival station 12 is a station 12 that was subject to provide additional advantages because it was determined by the system that vehicles 17 should move in/out some docks 16 to improve the vehicles 17 distribution among stations 12.

Figure 11:
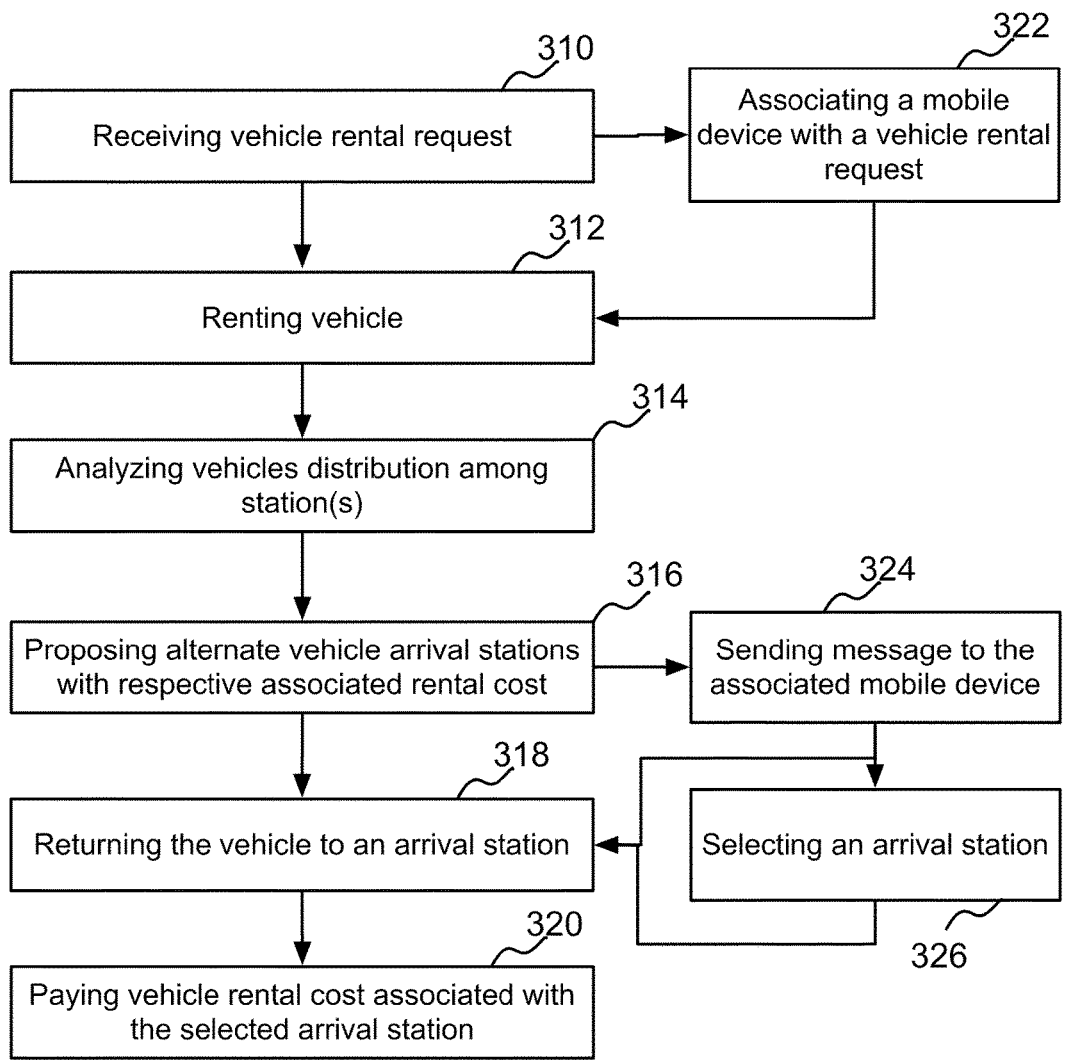
FIG. 11 is an exemplary illustrative flow chart of an interaction sequence between a system and a user in accordance with an embodiment of the invention.

FIG. 11 illustrates a series of exemplary steps providing the system to communicate with a renter using the renter's mobile computer 34, 36 or preferably his/her mobile phone 32. When a vehicle rental request is received 310 the renter can associate its mobile device 32, 34, 36 with the rental by inserting its e-mail address, mobile phone number (for SMS and voice) or other means to remotely receive information therewith. These information could be stored in the mobile phone 32 or the network 20 storage if desired by the user, which could be convenient if the user is a returning renter. The renter rents a vehicle 17, 312, and the system analyzes vehicles 17 distribution among stations 12, 314, and proposes alternate arrival stations 12 with associated benefits 316. A message is sent to the renter 324, who is away from the station 12, to inform the renter of arrival stations 12 that are offering benefits if s/he returns the vehicle 17 to one of them. The renter can select on its mobile computer 32, 34, 36 the desired arrival station 12, 326, or simply head to and return the vehicle to an arrival station 12, 318. If the arrival station is one of the proposed arrival stations 12 the renter receives the associated benefits. In contrast, if the selected arrival station 12 is not a proposed arrival station 12 then no benefits are provided to the renter. The renter pays for the rent of the vehicle 17, 320.

Figure 12:
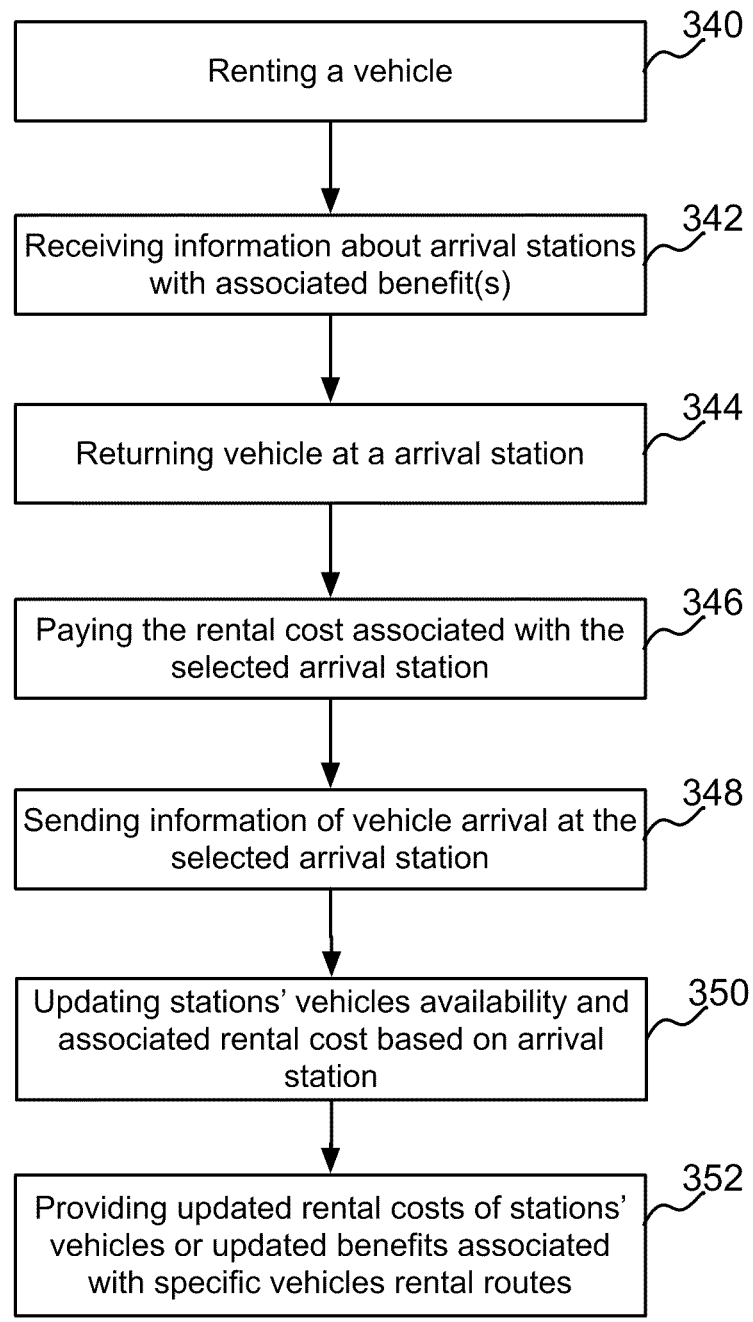
FIG. 12 is an exemplary illustrative flow chart of an interaction sequence between a system and a user in accordance with an embodiment of the invention.

An alternate exemplary series of steps are illustrated on FIG. 12. A renter rents a vehicle 17, 340, and receives information about arrival stations 12 associated with benefits 342. The user returns the vehicle 17 at an arrival station 12, 344, and pays the rental cost associated with the selected arrival station 346. The vehicle 17 arrival is acknowledged by the system 348 and vehicle distribution among stations is recalculated 350 to provide updated units rental route inventive 352.

The information related to provided incentives to use departure stations 12 or arrival stations 12 can be provided to a renter via his/her mobile computer devices 32, 34, 36. In more details, the user enters the computer device 32, 34, 36 information (either a mobile phone number, an e-mail address or another identification) that is used by the system to reach the computer device 32, 34, 36. Alternatively, a Bluetooth connection or the like can directly link the vehicle 17 to the computer device 32, 34, 36. This is a way to reach the user of the vehicle 17 during its rental time to provide additional information such as potential arrival stations 12, targeted marketing, special offers, safety information, weather, preferred path to use with the vehicle 17, etc. . . . . The potential arrival stations 12 can be determined by assessing the position of the rented vehicle 17 by mobile phone tower triangulation or by GPS positioning.

Additionally, one can appreciate, from FIG. 7, that the server 14 is connected with an historical database 240 of past vehicle 17 use over time and a map database 260 configured to locate stations 12 thereon and positions of vehicles 17 thereon (visible in FIG. 7).

Figure 13:
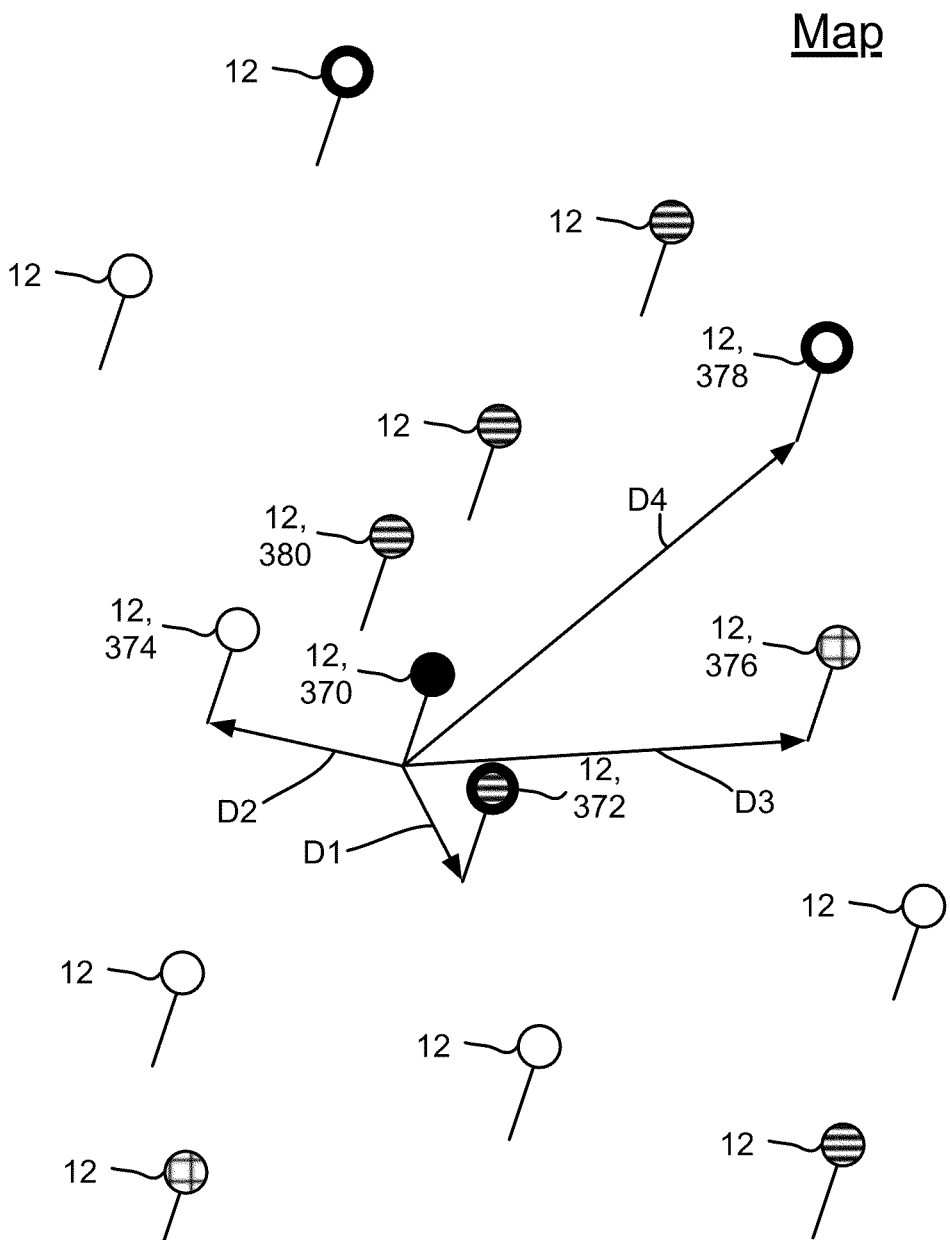
FIG. 13 is an exemplary illustrative map indicating vehicles availability and distances of stations in accordance with an embodiment of the invention.

Turning now to FIG. 13 illustrating an exemplary map of the geographical positions of stations 12 in a hypothetical location. The departure station 12, 370 is a full station 12 where all docks 16 are occupied by a vehicle 17. A renter who wants to rent a vehicle 17 from station 12, 370, would have, lets say, a few incentive points for renting a vehicle 17 from a station 12 that all docks 16 are taken 370 and to move away a vehicle 17 toward another station 12 where an empty dock 16 is available. Conversely, a renter who rents a vehicle 17 from station 380, that has some vehicles 17 therein, would not get the incentive rewards because there is no need to remove or to add vehicles 17 from station 12, 380. The renter takes a vehicle 17 from station 12, 370 and receives an SMS message informing him/her that there are additional incentive rewards if he/she brings the vehicle 17 to empty station 12, 374. In this situation the renter receives departure incentive rewards and arrival incentive rewards.

The same principle can be used to identify the distance and the vertical difference between stations 12. This way, a user car get an idea of the difficulty of each path between stations 12. The quantity of energy required going from either the location of the vehicle or from a station 12 to another station 12 can be provided.

If the renter want more arrival incentive rewards he/she is informed that he/she could bring the vehicle 17 to station 12, 378 because this station 12, 378 is also empty and is also used more than station 12, 374. The amount of incentive rewards is attributed by taking into consideration the historical use of each station 12 to ensure there are always some vehicles 17 to rent and some receiving docks 16 available at each station 12. The distance can also effect the amount of given incentive rewards. For instance, station 12, 378 is further away at distance D4 from departure station 370 than station 374 at distance D2. Additional incentive rewards are given to the renter because of the longer distance and/or the vertical distance therebetween.

The illustrative embodiment of FIG. 13 uses, inter alia, the historical usage data, the day and the time of the day, the distance, the number of vehicles 17 at stations 12 and the number of empty docks 16 at stations 12 to make a determination of an incentive to move vehicles 17 between stations 12 by renters as opposed to move vehicles 12 manually by employees loading trucks and trailers. The algorithm can weight each criterion to determine optimal incentive rewards to offer to renters. The incentive rewards could exemplary be, inter alia, a membership cost credit, a reduced rental cost, incentive points, Airmiles™, Aeroplan™ or other means to influence the choice of the renter without departing from the scope of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. In a bike rental network comprising,
 a plurality of bike rental stations and a plurality of bikes, wherein each bike has a machine-readable unique identifier of the bike, wherein each bike rental station has a plurality of docks, each dock for receiving one of the bikes for rent to a renter, and wherein each dock is configured to read the unique identifier of each bike received there at, and
 a remote server in electronic communication with each of the bike rental stations and configured to communicate with a plurality of mobile phones,
 a method of redistributing the bikes among the bike rental stations comprising the steps of:
 for each bike, when rented at a respective bike rental station, authenticating, by the remote server, a renter of the bike using a mobile phone of the renter, receiving, by the remote server, from the renter's mobile phone, a unique identifier of one of the bikes for rent, which bike is received within and locked at a dock of the bike rental station, associating, by the remote server, the renter's mobile phone with the unique identifier of the bike, thereafter, unlocking the bike at the dock of the respective bike rental station for use by the renter during a rental period of the bike;
 for each rented bike, during the rental period of the bike, electronically receiving, by the remote server, location information of the renter's mobile phone associated with the unique identifier of the rented bike, which location information is calculated using geographical localization functions of the renter's mobile phone;
 communicating, by the remote server, with the plurality of bike rental stations and based thereon identifying, by the remote server, one or more bike rental stations in need of bikes for rent;
 based on the received location information of the renter's mobile phone associated with the unique identifier of the rented bike, and based on the one or more bike rental stations identified as in need of bikes for rent, determining, by the remote server, an identified bike rental station that is in a neighborhood of the renter's mobile phone associated with the unique identifier of the rented bike, and communicating to the renter's mobile phone, by the remote server, the bike rental station as an arrival station for return of the rented bike.

2. The method of claim 1, further comprising determining availability for receiving returned bikes at the one or more bike rental station is electronically detected, by electronically detecting whether a bike is present at each dock of the bike rental station.

3. The method of claim 1, further comprising reading the unique identifier of the bike received at the dock of one of the plurality of bike rental stations using a sensor located at the dock, whereby the presence of the bike received in the dock is electronically detected.

4. The method of claim 1, wherein the bike rental stations are self-service.

5. The method of claim 1, further comprising, upon return of the rented bike at the communicated arrival station, electronically processing payment for the rented bike at a reduced rental amount.

6. The method of claim 1, further comprising the step of receiving, by the remote server, identification of a desired bike rental station for return of the bike by the renter, wherein the bike rental station that later is identified by the remote server as the arrival station for return of the rented bike by the renter is different from the desired bike rental station received by the remote server.

7. The method of claim 1, further comprising temporarily augmenting onboard electronics of the bike that is rented by pairing onboard electronics of the bike with the renter's mobile phone to enable two-way communications between the onboard electronics of the bike and the renter's mobile phone, and to enable two-way communications between the onboard electronics of the bike and the remote server via the renter's mobile phone.

8. The method of claim 1, further comprising displaying on a screen, for view by the renter, the communicated arrival station for return of the rented bike by the renter.

9. The method of claim 1, further comprising displaying on the mobile phone of the renter, for view by the renter, the communicated arrival station for return of the rented bike by the renter.

10. The method of claim 1, wherein communicating, by the remote server, to the renter's mobile phone comprises sending an email by the remote server to an email address of the renter that is accessible by the renter using the renter's mobile phone.

11. The method of claim 1, wherein communicating, by the remote server, to the renter's mobile phone comprises sending a text message by the remote server to the renter's mobile phone.

12. The method of claim 1, wherein communicating, by the remote server, to the renter's mobile phone comprises making a call to the renter's mobile phone.

13. A bike rental network system comprising,
 a plurality of bike rental stations and a plurality of bikes, each bike having a machine-readable unique identifier of the bike, each bike rental station having a plurality of docks, each dock for receiving one of the bikes for rent to a renter and each dock being configured to read the unique identifier of the bike received there at, and
 a remote server in electronic communication with each of the bike rental stations and configured to communicate with a plurality of mobile phones, wherein the remote server is configured to redistribute the bikes among the bike rental stations of the bike rental network system by executing computer-executable instructions contained in a non-transitory computer-readable medium that, when executed, perform a method comprising the steps of:

for each bike, when rented at a respective dock of a respective bike rental station, authenticating a renter of the bike using a mobile phone of the renter, receiving from the renter's mobile phone, a unique identifier of one of the bikes for rent, which bike is received within and locked at a dock of one of the bike rental stations, associating the renter's mobile phone with the unique identifier of the bike, and thereafter causing the bike at the respective dock of the respective bike rental station to be unlocked for use by the renter during a rental period of the bike;

for each bike, during the rental period of the bike, electronically receiving location information of the renter's mobile phone associated with the unique identifier of the rented bike, which location information is calculated using geographical localization functions of such mobile phone;

communicating with the plurality of bike rental stations and identifying one or more bike rental stations in need of bikes for rent; and based on the received location information of the renter's mobile phone associated with the unique identifier of the rented bike, and based on the one or more bike rental stations identified as in need of bikes for rent, determining an identified bike rental station that is in a neighborhood of the renter's mobile phone associated with the unique identifier of the rented bike, and communicating to such mobile phone, by the remote server, such bike rental station as an arrival station for return of the rented bike.

14. The network system of claim 13, wherein the rented bike comprises onboard electronics, and wherein the onboard electronics is temporarily augmented during the rental period of the bike by pairing the onboard electronics of the bike with the renter's mobile phone such that two-way communications is enabled between the onboard electronics of the bike and the renter's mobile phone, and such that two-way communications is enabled between the onboard electronics of the bike and the remote server via the renter's mobile phone.

15. The network system of claim 13, wherein communicating, by the remote server, to the renter's mobile phone comprises sending an email by the remote server to an email address of the renter that is accessible by the renter using the renter's mobile phone.

16. The network system of claim 13, wherein communicating, by the remote server, to the renter's mobile phone comprises sending a text message by the remote server to the renter's mobile phone.

17. A method drawn to a specific implementation of managing availability of bikes for rent among a plurality of bike rental stations, the method comprising the steps of:

for a first rental period of a bike, receiving, by a remote server, an identification of a first mobile phone that has been paired with a unique identifier of a bike at a first bike rental station of the plurality of bike rental stations, and causing, by the remote server, the bike to be unlocked at a dock of the first bike rental station for use by the renter;

and while the bike is rented, receiving, at the remote server, from the first mobile phone paired with the rented bike for the first rental period, a current location of the first mobile phone determined using geographical localization functions of the first mobile phone, determining, at the remote server, based on the communicated current location of the first mobile phone, a bike rental station of the plurality of bike rental stations as an arrival station for return of the rented bike, which bike rental station is in need of bikes for rent, and which bike rental station is within a neighborhood of the first mobile phone, and communicating, from the remote server to the first mobile phone paired with the rented bike for the first rental period, an indication of the determined arrival station; and receiving from the determined arrival station, by the remote server, a communication that the rented bike has been returned at a dock of the determined arrival station; and for a subsequent rental period of the same bike, receiving, from a subsequent bike rental station out of the plurality of bike rental stations, by the remote server, an identification of a second mobile phone that has been subsequently paired at the subsequent bike rental station with the unique identifier of the bike, and causing, by the remote server, the bike to be unlocked at a dock of the subsequent bike rental station for rent; and while the bike is rented, receiving, at the remote server, from the second mobile phone paired with the rented bike for the subsequent rental period, a current location of the second mobile phone determined using geographical localization functions of the second mobile phone, determining, at the remote server, based on the communicated current location of the second mobile phone, a bike rental station of the plurality of bike rental stations as a subsequent arrival station for return of the rented bike, which bike rental station is in need of bikes for rent, and which bike rental station is within a neighborhood of the second mobile phone, and communicating, from the remote server to the second mobile phone paired with the rented bike for the subsequent rental period, an indication of the determined subsequent arrival station; and receiving from the determined subsequent arrival station, by the remote server, a communication that the rented bike has been returned at a dock of the determined subsequent arrival station; wherein the remote server is in communication with the plurality of bike rental stations, and determines those bike rental stations that are in need of bikes for rent, during the first and subsequent rental periods.

18. The method of claim 17, wherein onboard electronics of the bike that is rented is temporarily augmented by pairing the onboard electronics of the respective bike with the renter's mobile phone such that two-way communications is enabled between the onboard electronics of the bike and the renter's mobile phone, and such that two-way communications is enabled between the onboard electronics of the bike and the remote server via the renter's mobile phone.

19. The method of claim 17, wherein communicating, by the remote server, to the renter's mobile phone comprises sending an email by the remote server to an email address of the renter.

20. The method of claim 17, wherein communicating, by the remote server, to the renter's mobile phone comprises sending a text message by the remote server to a mobile telephone number of the mobile phone of the renter.

* * * * *